United States Patent
Veis

(10) Patent No.: US 9,266,362 B2
(45) Date of Patent: Feb. 23, 2016

(54) PALLET CONVEYOR COMPRISING A SERVICE STATION

(71) Applicant: Hewlett-Packard Industrial Printing Ltd., Netanya (IL)

(72) Inventor: Alex Veis, Kadima (IL)

(73) Assignee: Hewlett-Packard Industrial Printing Ltd, Netanya (IL)

( * ) Notice: Subject to any disclaimer, the term of this patent is extended or adjusted under 35 U.S.C. 154(b) by 0 days.

(21) Appl. No.: 14/539,024

(22) Filed: Nov. 12, 2014

(65) Prior Publication Data

US 2015/0054900 A1 Feb. 26, 2015

Related U.S. Application Data

(63) Continuation of application No. 13/688,710, filed on Nov. 29, 2012, now Pat. No. 8,919,950, which is a continuation-in-part of application No. PCT/US2011/024372, filed on Feb. 10, 2011.

(51) Int. Cl.

| | |
|---|---|
| *B41J 2/01* | (2006.01) |
| *B41J 11/02* | (2006.01) |
| *B41J 11/00* | (2006.01) |
| *B65G 37/00* | (2006.01) |
| *B65G 17/48* | (2006.01) |
| *B65G 17/12* | (2006.01) |
| *B65G 17/06* | (2006.01) |

(52) U.S. Cl.
CPC ............... *B41J 11/02* (2013.01); *B41J 11/007* (2013.01); *B65G 17/06* (2013.01); *B65G 17/12* (2013.01); *B65G 17/123* (2013.01); *B65G 17/48* (2013.01); *B65G 37/00* (2013.01)

(58) Field of Classification Search
CPC ........ B65G 17/00; B65G 17/06; B65G 17/48; B65G 17/12; B65G 17/123; B65G 37/00; B41J 11/07; B41J 13/10; B41J 11/007; B41J 11/02
USPC ................ 347/104, 105, 101, 29–33, 22; 198/797–800
See application file for complete search history.

(56) References Cited

U.S. PATENT DOCUMENTS

| | | |
|---|---|---|
| 4,031,825 A | 6/1977 | Jaffa |
| 4,264,004 A | 4/1981 | Harwick |
| 4,383,605 A | 5/1983 | Harwick |
| 4,927,486 A | 5/1990 | Fattal et al. |
| 4,946,298 A | 8/1990 | Oka et al. |

(Continued)

FOREIGN PATENT DOCUMENTS

| | | |
|---|---|---|
| CN | 201685541 | 12/2010 |
| DE | 19847249 | 4/2000 |

(Continued)

OTHER PUBLICATIONS

Paul G. Ranky, "Assembly Automation," www.emeraldinsight.com, ISSN 0144-5154, vol. 27, No. 2, pp. 97-102, 2007.

(Continued)

*Primary Examiner* — Henok Legesse
(74) *Attorney, Agent, or Firm* — HP Inc Patent Department

(57) ABSTRACT

A pallet conveyor includes a conveyor track to guide pallets, and a service station deployed on the conveyor track, the service station to perform a service operation in the pallet conveyor.

19 Claims, 4 Drawing Sheets

(56) References Cited

U.S. PATENT DOCUMENTS

| | | | |
|---|---|---|---|
| 5,009,306 A | 4/1991 | Roderick et al. | |
| 5,642,604 A | 7/1997 | Muller | |
| 5,760,801 A * | 6/1998 | Jackson et al. | 347/29 |
| 6,068,209 A | 5/2000 | Nakamura | |
| 6,293,387 B1 | 9/2001 | Forster | |
| 6,422,139 B1 | 7/2002 | DeCruz | |
| 6,640,958 B2 | 11/2003 | Postlmayr | |
| 6,652,088 B1 | 11/2003 | Palmer et al. | |
| 6,702,438 B2 | 3/2004 | Codos et al. | |
| 6,731,898 B1 | 5/2004 | Landa et al. | |
| 7,128,389 B2 * | 10/2006 | Okamoto et al. | 347/29 |
| 7,185,886 B2 | 3/2007 | Tamura | |
| 7,987,969 B2 | 8/2011 | Detmers et al. | |
| 8,851,664 B2 * | 10/2014 | Spence | 347/104 |
| 8,919,950 B2 * | 12/2014 | Veis | 347/104 |
| 9,067,408 B2 | 6/2015 | Veis | |
| 2001/0030111 A1 | 10/2001 | Bethke et al. | |
| 2001/0045970 A1 | 11/2001 | Burikov et al. | |
| 2002/0007789 A1 | 1/2002 | Doyle et al. | |
| 2003/0230941 A1 | 12/2003 | Jacobs | |
| 2004/0155921 A1 * | 8/2004 | Simmons et al. | 347/33 |
| 2007/0126832 A1 | 6/2007 | Kito | |
| 2007/0194034 A1 | 8/2007 | Vasiadis | |
| 2008/0192075 A1 | 8/2008 | Campion et al. | |
| 2008/0278538 A1 * | 11/2008 | Tokuno | 347/33 |
| 2009/0056567 A1 | 3/2009 | Ando et al. | |
| 2009/0276084 A1 | 11/2009 | Pandit et al. | |
| 2013/0170928 A1 | 7/2013 | Veis | |

FOREIGN PATENT DOCUMENTS

| | | |
|---|---|---|
| EP | 0609669 | 8/1994 |
| KR | 20090044459 | 5/2009 |

OTHER PUBLICATIONS

Korean Intellectual Property Office, PCT International Search Report for PCT/US2011/024372 dated Nov. 21, 2011 (3 pages).

Korean Intellectual Property Office, PCT Written Opinion of the International Searching Authority for PCT/US2011/024372 dated Nov. 21, 2011 (4 pages).

The International Bureau of WIPO, PCT International Preliminary Report on Patentability for PCT/US2011/024372 dated Aug. 13, 2013 (5 pages).

* cited by examiner

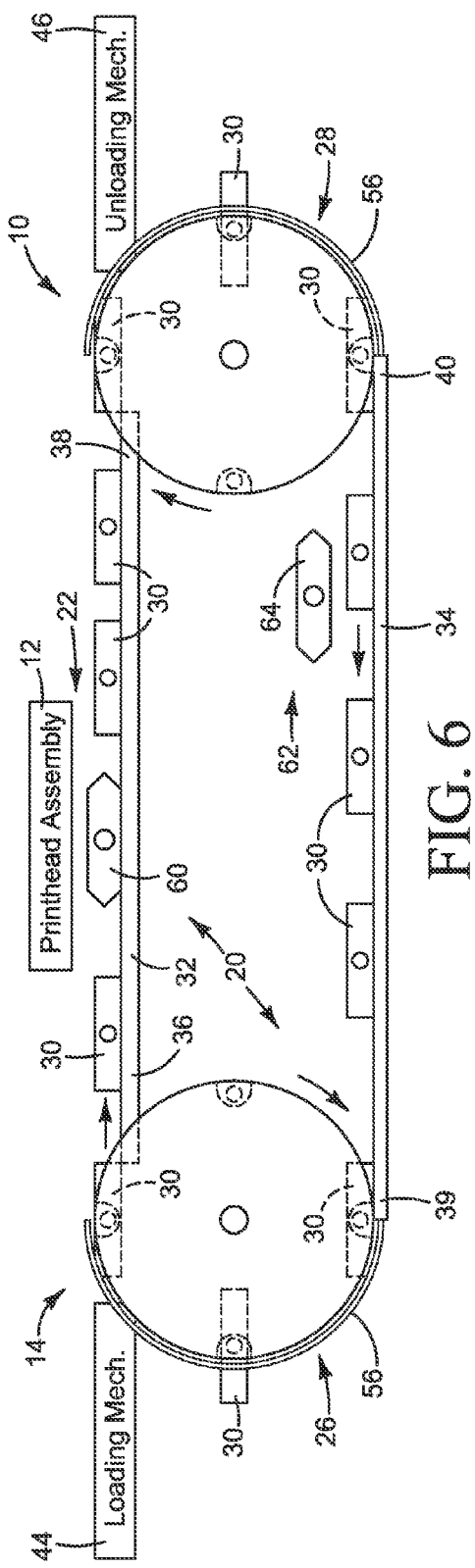
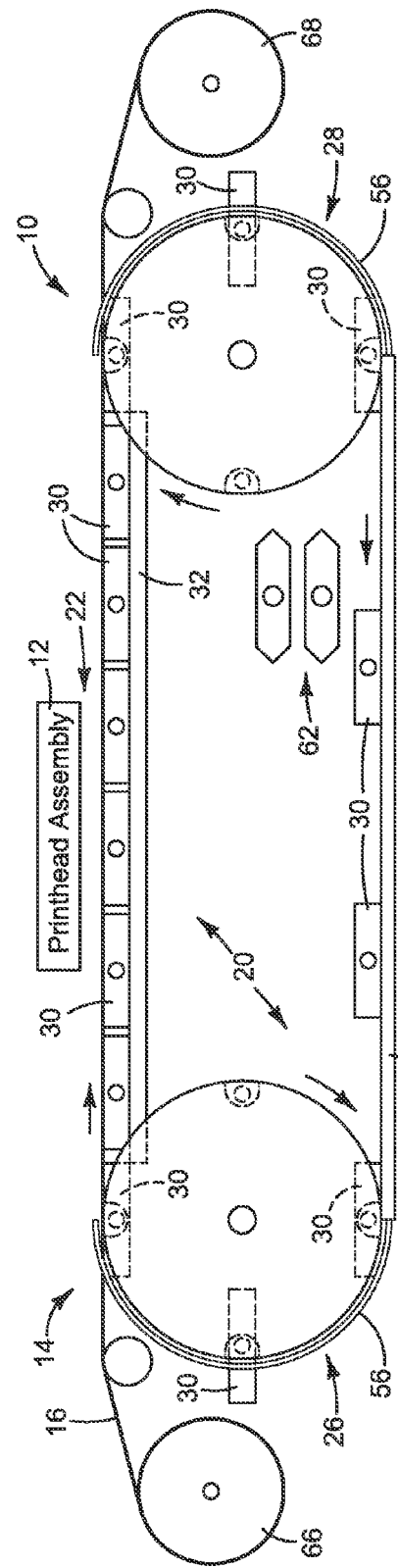

PALLET CONVEYOR COMPRISING A SERVICE STATION

CROSS REFERENCE TO RELATED APPLICATIONS

This is a continuation of U.S. application Ser. No. 13/688,710, filed Nov. 29, 2012, which is a continuation-in-part of International Application No. PCT/US2011/024372, filed 10 Feb. 2011, both hereby incorporated by reference.

BACKGROUND

Some inkjet printers are capable of printing on very large rigid print substrates. Efficiently handling large rigid print substrates presents special challenges compared to handling more traditional print substrates.

DRAWINGS

FIG. 6 illustrates an inkjet printer such as the one shown in FIGS. 2 and 3 in which the pallet conveyor is configured to deploy a service station to the printhead assembly.

FIG. 7 illustrates an inkjet printer in which a pallet conveyor such as the one shown in FIGS. 2 and 3 supports a continuous web of print substrate.

The same part numbers designate the same or similar parts throughout the figures.

DESCRIPTION

International patent application number PCT/US2011/024372 (WO 2012/108870) discloses an inkjet printer that uses an endless conveyor to circulate pallets through a print zone to support the print substrate during printing. Although the pallet conveyor disclosed in PCT/US2011/024372 may be used with other print substrates, it is particularly well suited for handling corrugated boards, cardboards, and other large rigid print substrates. A new device has been developed for use in a pallet conveyor such as that disclosed in PCT/US2011/024372 to improve the transfer of pallets between the forward track that carries pallets through the print zone and the return track that carries pallets back to the start of the forward track.

In one example, a new pallet transfer device includes two wheel elevators that transfer pallets between the forward track and the return track. The first wheel elevator is operatively coupled between the downstream part of the return track and the upstream part of the forward track to receive pallets from the return track and give pallets to the forward track. The second wheel elevator is operatively coupled between the downstream part of the forward track and the upstream part of the return track to receive pallets from the forward track and give pallets to the return track. In one particular implementation, the wheel elevators are configured to give each pallet to one track at the same speed and in the same orientation the pallet is received from the other track, to maintain printer speed and to help keep the pallets from disturbing the print substrate during loading and unloading.

Examples of the new transfer device will be described with reference to a pallet conveyor supporting print substrates in an inkjet printer. Examples of the new transfer device, however, are not limited to use in inkjet printers, but may be implemented in other printers or with pallet conveyor systems used in other types of devices. Accordingly, the examples shown in the figures and described below illustrate but do not limit the invention which is defined in the Claims following this Description.

As used in this document, a "wheel elevator" means a device employing a wheel or wheels to move an article along the perimeter or other arc of the wheel(s) from one location to another location.

Figure 1:
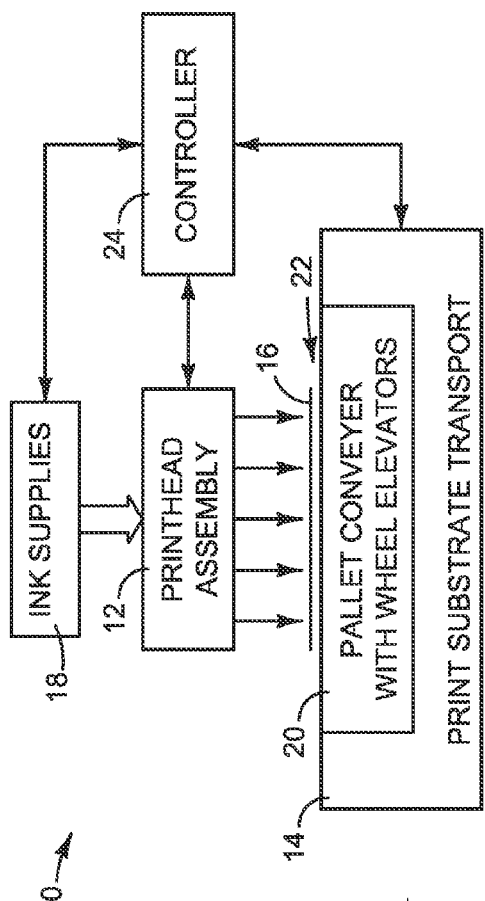
FIG. 1 is a block diagram illustrating an inkjet printer in which examples of a new pallet conveyor for print substrate transport may be implemented.

FIG. 1 is a block diagram illustrating an inkjet printer 10 in which examples of a new pallet conveyor may be implemented. Referring to FIG. 1, printer 10 includes a printhead assembly 12, a print substrate transport system 14 for moving a print substrate 16 past printhead assembly 12, and ink supplies 18 for supplying ink to printhead assembly 12. Printhead assembly 12 includes an arrangement of one or more printheads for dispensing ink on to a sheet or continuous web of paper or other print substrate 16. Printhead assembly 12 may be stationary with a substrate wide array of printheads or carriage mounted to scan the printhead(s) back and forth across substrate 16.

Print substrate transport 14 includes a pallet conveyor 20 that moves groups of pallets through the print zone 22 to support print substrate 16 under printhead assembly 12. As described in detail below, pallet conveyor 20 utilizes a pair of wheel elevators to transfer pallets between the forward track and the return track. Printer 10 also includes an electronic controller 24 which represents generally the programming, processor(s) and associated memories, and the electronic circuitry and components needed to control the operative elements of printer 10.

Figure 2:
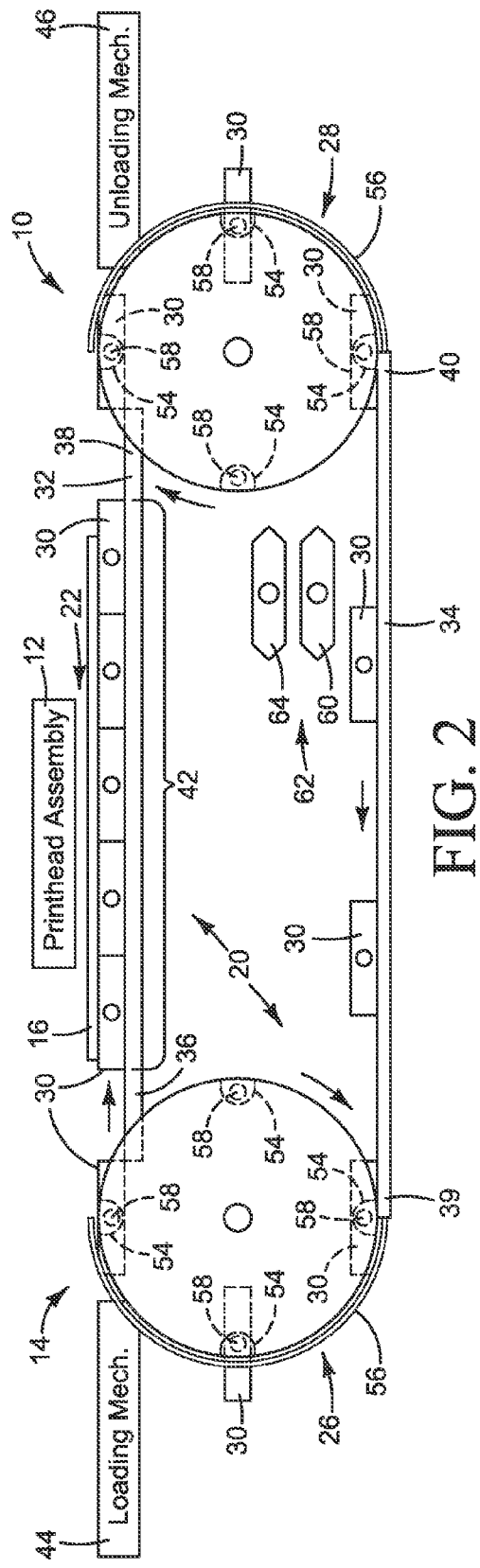
FIGS. 2 and 3 are front and side elevation views, respectively, illustrating an inkjet printer implementing one example of a new pallet conveyor in which wheel elevators are used to transfer pallets between the forward track and the return track.
Figure 3:
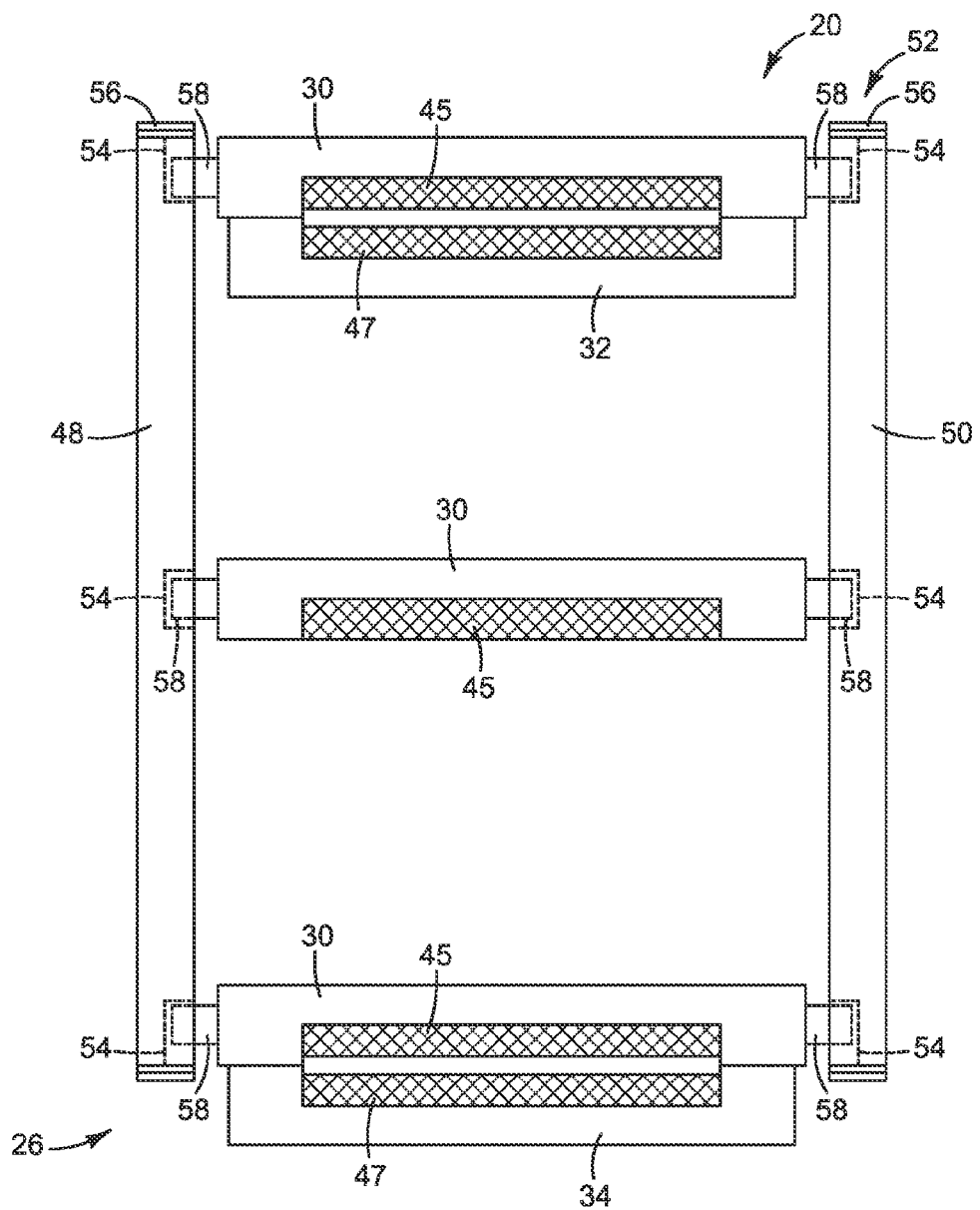
Figure 4:
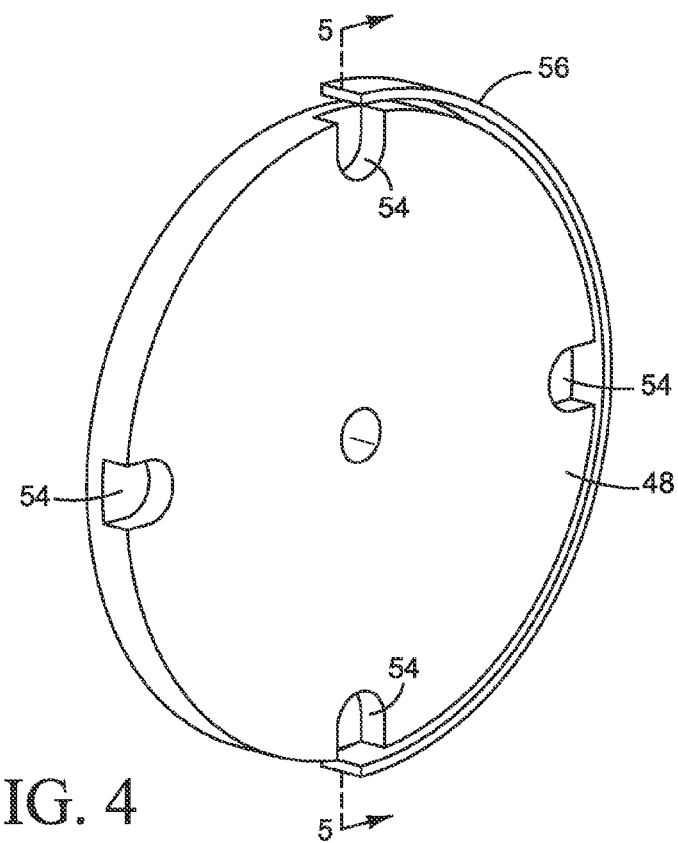
FIGS. 4 and 5 are detail views showing one of the wheels in a wheel elevator shown in FIGS. 2 and 3.
Figure 5:
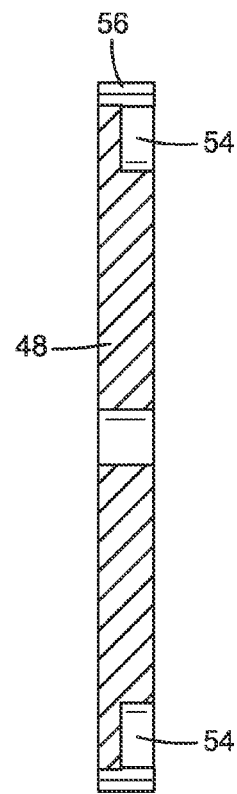

FIGS. 2 and 3 are front and side elevation views, respectively, illustrating an inkjet printer 10 implementing one example of a new pallet conveyor 20 in which wheel elevators 26, 28 are used to transfer pallets 30 between the conveyor forward track 32 and the conveyor return track 34. Only conveyor 26 is seen in FIG. 3. Referring to FIGS. 2 and 3, print substrate transport 14 includes an endless conveyor 20 to circulate pallets 30 through print zone 22. The forward track 32 of conveyor 20 guides pallets 30 through print zone 22 from an upstream part 36 to a downstream part 38. The first wheel elevator 26 is operatively coupled between the downstream part 39 of return track 34 and the upstream part 36 of forward track 32 to receive pallets 30 from return track 34 and give pallets 30 to forward track 32. The second wheel elevator 28 is operatively coupled between the downstream part 38 of forward track 32 and the upstream part 40 of return track 34 to receive pallets 30 from forward track 32 and give pallets 30 to return track 34.

In the example shown in FIG. 2, some of the pallets 30 are grouped together along forward track 32 to carry a substrate sheet 16 through print zone 22. Substrate sheet 16 in FIG. 2 represents generally a flexible sheet, a rigid board, or any other substrate printed as individual pieces. The speed of pallets 30 may be controlled individually to join and leave pallet group 42 and controlled collectively as a group 42 to maintain the desired speed of print substrate 16 through print zone 22. Transport 14 may also include a loading mechanism 44 to load substrate sheets 16 on to pallets 30 and an unloading mechanism 46 to unload substrate sheets 16 from pallets 30. Examples of conveyor tracks 32 and 34, loading mechanism 44, and unloading mechanism 46 are described in patent application number PCT/US2011/024372, which is incorporated herein by reference in its entirety. Electromagnetic elements 45 and 47 on tracks 32, 34 and on pallets 30 are shown in FIG. 3 as one example conveyor motor system described in application PCT/US2011/024372. The forward track 32 includes a pair of rails, and the return track 34 includes a pair of rails. Pallets are rollingly supported by rollers on the rails of the forward track, and pallets are rollingly supported by rollers on the rails of the return track. The pallets are moveable relative to the rails of each of the forward track and the return track. In other implementations, each track 32, 34 includes a single rail.

Referring to FIGS. 2-5, each wheel elevator 26, 28 includes a pair of wheels 48, 50 positioned opposite one another on each side of conveyor tracks 32, 34, and a holder 52 operatively connected to each pair of wheels 48, 50 to receive, hold and release pallets 30 for transfer between tracks 32 and 34. An electric motor or other suitable drive mechanism (not shown) operatively coupled to controller 24 may be used to rotate each pair of wheels 48, 50. In the example shown, each holder 52 includes a series of openings 54 along the perimeter of wheels 48, 50 and a stationary guide 56 that together passively receive, hold and release axles 58 on pallets 30. Also, pallets 30 and holders 52 are configured to give each pallet 30 to one track 32, 34 in the same orientation the pallet is received from the other track 32, 34. The desired pallet orientation may be maintained, for example, by allowing pallet axles 58 to rotate freely within openings 54 and/or by allowing the body of each pallet 30 to rotate freely on axles 58. Other suitable configurations for holders 52 are possible. For example, a retractable gate at each opening 54 could be used to retain pallet axles 58 during the transfer between conveyor tracks 32 and 34. For another example, an electromagnetic latch could be employed to receive, hold and release pallets 30 during the transfer.

Wheel elevators 26, 28 for pallet transfer in conveyor 20 enable the simultaneous and continuous transfer of pallets to and from tracks 32 and 34. Thus, in one mode for operating conveyor 20, each pair of elevator wheels 48, 50 is turned simultaneously with the other pair so that first wheel elevator 26 continuously receives pallets 30 from return track 34 and gives pallets to forward track 32 while second wheel elevator 28 continuously receives pallets 30 from forward track 32 and gives pallets 30 to return track 34. Although other conveyor operating modes are possible, it is expected that both elevator wheel pairs 48, 50 will usually be turned at the same time for simultaneously transferring pallets to and from tracks 32 and 34.

Wheel elevators 26 and 28 may be configured to give each pallet 30 to one track 32 or 34 at the same speed (as well as the same orientation) the pallet is received from the other track 32 or 34, to help maintain printer speed and to help keep pallets 30 from disturbing substrate 16 during loading and unloading. The number and spacing of openings 54 may be varied from that shown to help achieve the desired speed and/or spacing of pallets 30. Also, the rotational speed of each pair of wheels 48, 50 may be incrementally or continuously adjusted by controller 24 to match the speed of openings 54 at the perimeter of wheels 48, 50 to the speed of pallets 30 on tracks 32 and 34. The rotational speed of each wheel pair 48, 50 need not be the same. It may be desirable for some printer operations to drive the wheels in first elevator 26 faster or slower than the wheels in second elevator 28.

Pallet conveyor 20 may also be configured to deploy a service station to printhead assembly 12. For example, and referring to FIG. 6, a service station 60 has been deployed from a garage 62 along tracks 32, 34 to printhead 12 where it can perform a service operation. A second service station 64 remains in garage 62. Each service station 60, 64 represents a spittoon, wiper, suction or other servicing device implemented in a pallet-like unit for deployment along conveyor 20. At the direction of controller 24, a robotic arm or other suitable transfer mechanism (not shown) may be used to place service stations 60, 64 on to return track 34 and take the service stations 60, 64 off track 34 to return them to garage 62.

In the example shown in FIG. 7, a continuous web print substrate 16 is supported by pallets 30. Vacuum pallets 30 such as those described in application PCT/US2011/024372 may be used to advance web 16 through print zone 22 from a supply roll 66 to a take-up roll 68. The use of vacuum pallets 30 for advancing web 16 relieves undesirable tension in web 16 otherwise developed when take-up roll 68 pulls web 16 through print zone 22.

As noted at the beginning of this Description, the examples shown in the figures and described above illustrate but do not limit the invention. Other examples may be made and implemented. Therefore, the foregoing description should not be construed to limit the scope of the invention, which is defined in the following claims.

What is claimed is:

1. A pallet conveyor, comprising:
 a conveyor track to guide pallets, wherein the conveyor track comprises a forward track and a return track, the forward track to guide pallets from an upstream part of the forward track to a downstream part of the forward track;
 a pallet transfer device to:
  receive pallets from a downstream part of the return track and release the pallets to the upstream part of the forward track, wherein the pallets on the return track are at a different elevation than the pallets on the forward track; and
  receive the pallets from the downstream part of the forward track and release the pallets to an upstream part of the return track; and
 a service station deployed on the conveyor track, the service station to perform a service operation with respect to a printhead assembly of a printing system.

2. The pallet conveyor of claim 1, wherein the service station comprises a wiper.

3. The pallet conveyor of claim 1, wherein the service station comprises a suction device.

4. The pallet conveyor of claim 1, wherein the service station comprises a spittoon.

5. The pallet conveyor of claim 1, wherein the service station is removably deployable on the conveyor track.

6. The pallet conveyor of claim 5, further comprising a transfer mechanism to move the service station from a garage to the conveyor track, and to remove the service station from the conveyor track to return to the garage.

7. The pallet conveyor of claim 1, wherein the forward track includes a forward track rail, and the return track includes a return track rail, the pallets being moveable relative to each of the forward track rail and the return track rail.

8. The pallet conveyor of claim 7, wherein a first pallet of the pallets disengages from the return track rail as the first pallet is received by the pallet transfer device, and a second pallet of the pallets is released onto the forward track rail and disengages from the pallet transfer device as the second pallet is released to the upstream part of the forward track.

9. An apparatus comprising:
 multiple pallets; and an endless conveyor to circulate the pallets that support a print substrate through a print zone during printing, the endless conveyor comprising:
- a conveyor track to guide the pallets through the print zone along the conveyor track, the conveyor track having a first portion and a second portion, and the conveyor track to guide the pallets between the first portion and the second portion, wherein the pallets on the first portion are at a different elevation than the pallets on the second portion;
- a first service station deployed on the conveyor track, the first service station to perform a first service operation with respect to a printhead assembly of a printing system, the printhead assembly to dispense printing fluid onto the print substrate.

10. The apparatus of claim 9, wherein the first service station comprises at least one of a wiper, a suction device, and a spittoon.

11. The apparatus of claim 9, wherein the first service station is removably deployable on the conveyor track.

12. The apparatus of claim 11, wherein the conveyor further comprises a transfer mechanism to move the first service station from a garage to the conveyor track, and to remove the first service station from the conveyor track to return to the garage.

13. The apparatus of claim 9, further comprising a second service station deployed on the conveyor track, the second service station to perform a second service operation, wherein the second service operation is different from the first service operation.

14. An apparatus comprising:
multiple pallets; and
an endless conveyor to circulate the pallets through a print zone to support a print substrate during printing, the endless conveyor comprising:
- a conveyor track to guide the pallets through the print zone along the conveyor track, wherein the conveyor track comprises a forward track and a return track, the forward track to guide the pallets through the print zone from an upstream part of the forward track to a downstream part of the forward track;
- a first service station deployed on a conveyor track, the first service station to perform a first service operation;
- a first wheel elevator operatively coupled between a downstream part of the return track and the upstream part of the forward track to receive the pallets from the return track and release the pallets to the forward track; and
- a second wheel elevator operatively coupled between the downstream part of the forward track and an upstream part of the return track to receive the pallets from the forward track and release the pallets to the return track.

15. The apparatus of claim 14, wherein the forward track includes a forward track rail, and the return track includes a return track rail, the pallets being movable relative to each of the forward track rail and the return track rail.

16. The apparatus of claim 15, wherein a first pallet of the pallets disengages from the return track rail as the first pallet is received by the first wheel elevator, and a second pallet of the pallets is released onto the forward track rail and disengages from the first wheel elevator as the second pallet is released to the upstream part of the forward track.

17. A method comprising:
arranging a conveyor track to guide pallets, which support a print substrate onto which printing fluid is dispensed by a printing system, along the conveyor track having a first portion and a second portion, wherein the conveyor track guides the pallets along a curved path between the first portion and the second portion, wherein the pallets on the first portion are at a different elevation than the pallets on the second portion; and
deploying a service station on the conveyor track, the service station to perform a service operation with respect to a printhead assembly of the printing system.

18. The method of claim 17, further comprising arranging a transfer mechanism to move the service station from a garage to the conveyor track, and to remove the service station from the conveyor track to return to the garage.

19. The method of claim 17, wherein the service station comprises at least one of a wiper, a suction device, and a spittoon.

* * * * *